(12) United States Patent
Nakamura

(10) Patent No.: US 7,003,388 B2
(45) Date of Patent: Feb. 21, 2006

(54) CONTROL APPARATUS AND METHOD FOR LOCK-UP CLUTCH OF VEHICLE

(75) Inventor: Kazuaki Nakamura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 154 days.

(21) Appl. No.: 10/809,715

(22) Filed: Mar. 26, 2004

(65) Prior Publication Data

US 2004/0192506 A1 Sep. 30, 2004

(30) Foreign Application Priority Data

Mar. 28, 2003 (JP) .............................. 2003-090130

(51) Int. Cl.
*F16H 61/08* (2006.01)

(52) U.S. Cl. .............................. 701/67; 701/54; 701/59; 701/68; 192/3.29; 477/76

(58) Field of Classification Search ............ 701/51–59, 701/67, 68; 474/28; 477/72, 76, 98; 192/3.29, 192/3.3, 3.28, 3.31
See application file for complete search history.

(56) References Cited

U.S. PATENT DOCUMENTS

| | | | |
|---|---|---|---|
| 6,317,665 B1 * | 11/2001 | Tabata et al. ................. | 701/22 |
| 6,553,297 B1 * | 4/2003 | Tashiro et al. ............... | 701/48 |
| 6,656,084 B1 * | 12/2003 | Inoue et al. .................. | 477/38 |
| 6,692,402 B1 * | 2/2004 | Nakamori et al. ............ | 477/3 |
| 6,735,509 B1 * | 5/2004 | Watanabe et al. ............ | 701/62 |
| 6,754,574 B1 * | 6/2004 | Tokura et al. ................ | 701/67 |
| 6,817,965 B1 * | 11/2004 | Tabata ......................... | 477/33 |
| 6,855,090 B1 * | 2/2005 | Tabata et al. ............... | 477/107 |

FOREIGN PATENT DOCUMENTS

| | | |
|---|---|---|
| JP | 60-179553 | 9/1985 |
| JP | 2-42251 | 2/1990 |
| JP | 5-87222 | 4/1993 |

* cited by examiner

*Primary Examiner*—Richard M. Camby
(74) *Attorney, Agent, or Firm*—Oblon, Spivak, McClelland, Maier & Neustadt, P.C.

(57) ABSTRACT

A control apparatus for a lock-up clutch of a vehicle having a hydraulic torque transfer device equipped with the lock-up clutch between a power source and an automatic transmission is provided for controlling a hydraulic pressure of hydraulic oil supplied to the lock-up clutch when the clutch is in a slip region. The control apparatus determines whether an oil temperature of the hydraulic oil is lower than a predetermined temperature, calculates a change in input torque of the lock-up clutch, and determines whether the change in the input torque is larger than a predetermined value. When it is determined that the oil temperature of the hydraulic oil is lower than the predetermined temperature and that the change in the input torque is larger than the predetermined value, the control apparatus changes the hydraulic pressure of the hydraulic oil supplied to the lock-up clutch to a predetermined pressure for a predetermined length of time.

18 Claims, 13 Drawing Sheets

FIG. 2

| SHIFT POSITION | | SOLENOID NO.1 | SOLENOID NO.2 | C₁ | C₂ | B₁ | B₂ | F₁ | B₃ | F₂ | C₀ | F₀ | B₀ |
|---|---|---|---|---|---|---|---|---|---|---|---|---|---|
| P | | ⊗ | ⊗ | | | | | | | | ○ | | |
| R | | ⊗ | ⊗ | | ○ | | | | ○ | | ○ | | |
| N | | ⊗ | ⊗ | | | | | | | | ○ | | |
| D | 1st | ○ | × | ○ | | | | | | ○ | ○ | ○ | |
| D | 2nd | ○ | ○ | ○ | | | ○ | ○ | | | ○ | ○ | |
| D | 3rd | × | ○ | ○ | ○ | | ○ | | | | ○ | ○ | |
| D | O/D | × | × | ○ | ○ | | ○ | | | | | | ○ |
| S | 1st | ○ | × | ○ | | | | | | ○ | ○ | ○ | |
| S | 2nd | ○ | ○ | ○ | | ○ | ○ | ○ | | | ○ | ○ | |
| S | 3rd | × | ○ | ○ | ○ | | ○ | | | | ○ | ○ | |
| S | (O/D) | × | × | ○ | ○ | | ○ | | | | | | ○ |
| L | 1st | ○ | × | ○ | | | | | | ○ | ○ | ○ | |
| L | 2nd | ○ | ○ | ○ | | ○ | ○ | ○ | | | ○ | ○ | |

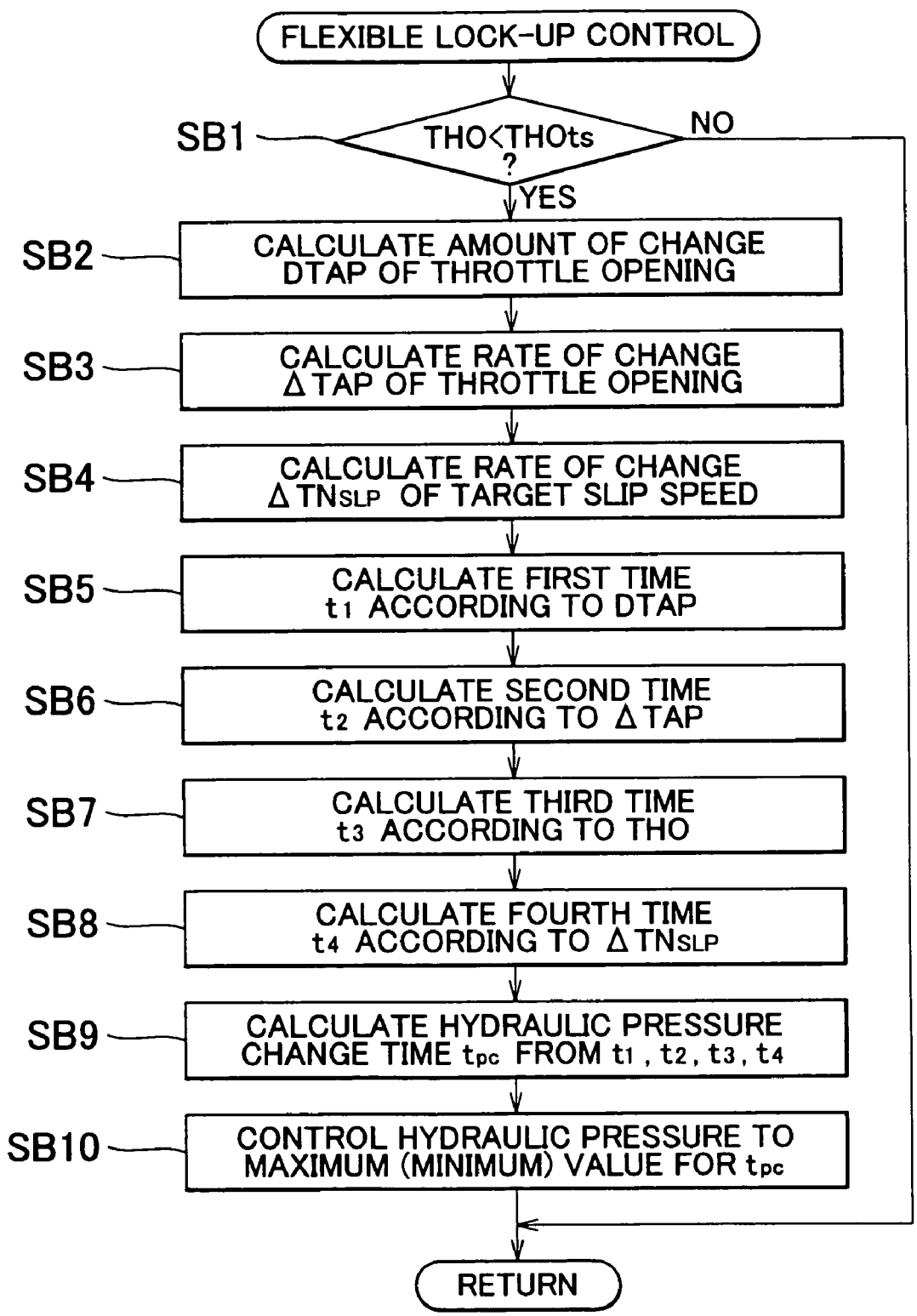

CONTROL APPARATUS AND METHOD FOR LOCK-UP CLUTCH OF VEHICLE

INCORPORATION BY REFERENCE

The disclosure of Japanese Patent Application No. 2003-090130 filed on Mar. 28, 2003, including the specification, drawings and abstract, is incorporated herein by reference in its entirety.

BACKGROUND OF THE INVENTION

1. Field of the Invention

The invention generally relates to an apparatus and a method for controlling a lock-up clutch of a vehicle, and, more particularly, to a technique for preventing or suppressing occurrence of hunting when the temperature of hydraulic oil supplied to the lock-up clutch is low.

2. Description of Related Art

Generally, a power transmitting system of a vehicle includes a plurality of hydraulic friction devices, and the engagement pressure of each of the hydraulic friction devices is controlled by hydraulic oil supplied from a hydraulic control circuit. However, the hydraulic friction device may be slowly engaged or engaged with a delay when the hydraulic oil has a low temperature before warm-up, for example, since the viscosity of the hydraulic oil is high. In view of this problem, various control apparatuses for automatic transmissions are known which change the hydraulic pressure of the hydraulic oil depending upon the temperature of the hydraulic oil that is associated with the engagement pressure of the hydraulic friction device. For example, a control apparatus for an automatic transmission as disclosed in JP-A-2-42251 is adapted to control the line pressure based on hydraulic oil temperature information supplied from an oil temperature sensor, so as to favorably avoid a delay in the engagement of hydraulic friction devices when the temperature of the hydraulic oil is low.

In a vehicle including a hydraulic torque transfer device equipped with a lock-up clutch, such as a torque converter equipped with a lock-up clutch or a fluid coupling equipped with a lock-up clutch, a control apparatus for the lock-up clutch is conventionally provided for setting a slip region between a release region in which the lock-up clutch is released and an engagement region in which the clutch is fully engaged or applied, and controlling a slip amount to place the lock-up clutch in a half-engaged state in the slip region, in order to improve the fuel economy of the vehicle by further reducing a rotation loss of the lock-up clutch. In the case where a relatively rapid change in the input torque occurs when the lock-up clutch is placed in the half-engaged state (or flexible state), the known control apparatus for the lock-up clutch may not operate with sufficient response if the temperature of the hydraulic oil is low, and thus may suffer from hunting. To solve this problem, the inventor has developed the concept of changing the hydraulic pressure of the hydraulic oil supplied to the lock-up clutch, depending upon the oil temperature of the hydraulic oil.

SUMMARY OF THE INVENTION

It is therefore an object of the invention to provide control apparatus and method for a lock-up clutch of a vehicle, which is able to avoid or suppress hunting when the temperature of the hydraulic oil is low.

To accomplish the above and/or other object(s), there is provided according to one aspect of the invention a control apparatus for a lock-up clutch of a vehicle having a hydraulic torque transfer device equipped with the lock-up clutch between a power source and an automatic transmission, for controlling a hydraulic pressure of a hydraulic oil supplied to the lock-up clutch when the lock-up clutch is in a slip region, comprising (a) a hydraulic oil temperature determining unit that determines whether an oil temperature of the hydraulic oil is lower than a predetermined temperature, (b) an input torque change calculating unit that calculates a change in input torque of the lock-up clutch, (c) an input torque change determining unit that determines whether the change in the input torque calculated by the input torque change calculating unit is larger than a predetermined value, and (d) a hydraulic pressure changing unit that changes the hydraulic pressure of the hydraulic oil supplied to the lock-up clutch to a predetermined pressure for a predetermined length of time, when the hydraulic oil temperature determining unit determines that the oil temperature of the hydraulic oil is lower than the predetermined temperature and the input torque change determining unit determines that the change in the input torque is larger than the predetermined value.

The control apparatus constructed as described above includes the hydraulic oil temperature determining unit that determines whether the oil temperature of the hydraulic oil is lower than the predetermined temperature, the input torque change calculating unit that calculates a change in the input torque of the lock-up clutch, the input torque change determining unit that determines whether the change in the input torque calculated by the input torque change calculating unit is larger than the predetermined value, and the hydraulic pressure changing unit that changes the hydraulic pressure of the hydraulic oil supplied to the lock-up clutch to the predetermined pressure for the predetermined length of time, when the hydraulic oil temperature determining unit determines that the oil temperature of the hydraulic oil is lower than the predetermined temperature, and the input torque change determining unit determines that the change in the input torque is larger than the predetermined value. With this arrangement, if a relatively rapid change in the input torque occurs when the temperature of the hydraulic oil is low, the control apparatus temporarily controls the hydraulic pressure of the lock-up clutch to a predetermined pressure of a relatively high level or a predetermined pressure of a relatively low level, thus assuring an improved response. Thus, the control apparatus for the lock-up clutch of the vehicle is able to avoid or suppress occurrence of hunting when the temperature of the hydraulic oil is low.

Preferably, the hydraulic pressure changing unit changes the predetermined length of time according to the change in the input torque calculated by the input torque change calculating unit. With this arrangement, the hydraulic pressure of the hydraulic oil can be advantageously controlled to the predetermined pressure for a sufficient length of time.

Preferably, the hydraulic pressure changing unit changes the predetermined length of time according to the oil temperature of the hydraulic oil. With this arrangement, the hydraulic pressure of the hydraulic oil can be advantageously controlled to the predetermined pressure for a sufficient length of time.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein:

FIG. 2 is a table explaining the relationship between the combination of the operating states of a first solenoid-operated valve and a second solenoid-operated valve in an automatic transmission of FIG. 1, and a plurality of gear stages to be established by means of the first and second solenoid-operated valves;

FIG. 15 is a flowchart explaining a principal part of a further flexible lock-up control routine executed by the electronic control unit of FIG. 1.

DETAILED DESCRIPTION OF EXEMPLARY EMBODIMENTS

Figure 1:
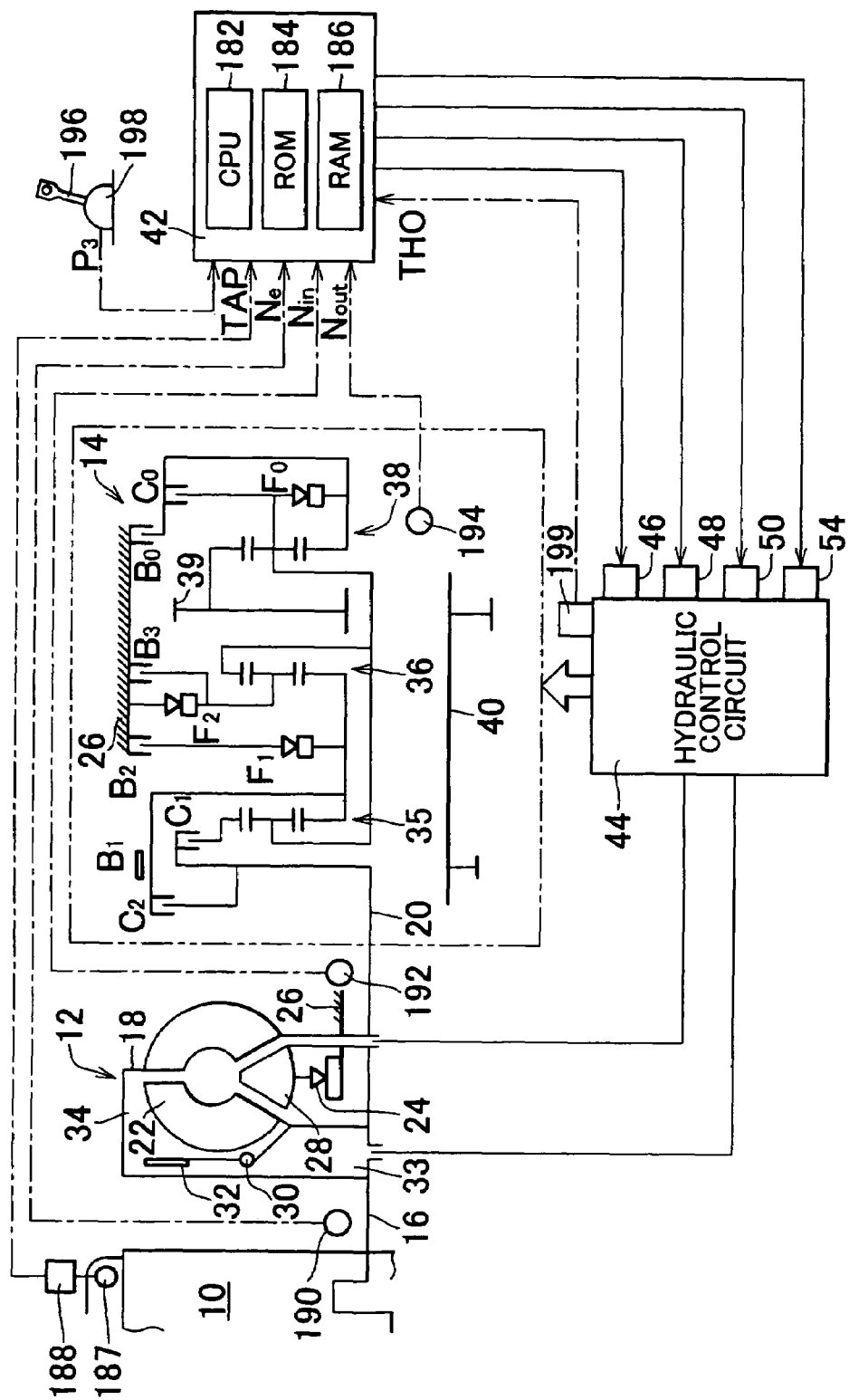
FIG. 1 is a view showing a power transmitting system of a vehicle, which employs a control apparatus according to one embodiment of the invention.

An exemplary embodiment of the invention will be described in detail with reference to the drawings. FIG. 1 schematically shows one example of a power transmitting system of a vehicle, which employs a control apparatus according to one embodiment of the invention. In the power transmitting system of FIG. 1, driving force or power generated by an engine 10 as a power source is transmitted to driving wheels, via a torque converter 12 equipped with a lock-up clutch as a hydraulic torque transfer device equipped with a lock-up clutch, an automatic transmission 14 composed of three planetary gear sets and other components, and a differential gear unit (not shown).

The torque converter 12 includes a pump impeller 18 coupled to a crankshaft 16 of the engine 10, a turbine wheel 22 fixed to an input shaft 20 of the automatic transmission 14 and adapted to be rotated by oil received from the pump impeller 18, a stator 28 fixed to a housing 26 as a stationary member via a one-way clutch 24, and a lock-up clutch 32 as a direct-coupled clutch coupled to the input shaft 20 via a damper 30. The torque converter 12 is also provided with a release side oil chamber 33 and an engaging side oil chamber 34, to which hydraulic oil is selectively supplied so as to control the operation of the lock-up clutch 32. When the hydraulic pressure in the release side oil chamber 33 is increased to be higher than that of the engaging side oil chamber 34, the lock-up clutch 32 is brought into a disengaged or released state in which torque is transmitted at an amplification factor that depends upon the ratio of the input and output rotational speeds of the torque converter 12. When the hydraulic pressure in the engaging side oil chamber 34 is increased to be higher than the release side oil chamber 33, on the other hand, the lock-up clutch 32 is brought into an engaged state in which input and output members of the torque converter 12, namely, the crankshaft 16 and the input shaft 20, are directly coupled to each other.

The automatic transmission 14 includes three single-pinion type planetary gear sets 35, 36, 38 arranged on the same axis, the input shaft 20, an output gear 39 that rotates with a ring gear of the planetary gear set 38, and a counter shaft (output shaft) 40 that transmits power between the output gear 39 and the differential gear unit. Some of the constituent elements of the planetary gear sets 35, 36, 38 are integrally coupled to each other, or are selectively coupled to each other by three clutches $C_0$, $C_1$, $C_2$. Also, some of the constituent elements of the planetary gear sets 35, 36, 38 are selectively coupled to the housing 26 via four brakes $B_0$, $B_1$, $B_2$, $B_3$, or are coupled to each other or engaged with the housing 26, depending upon the direction of rotation thereof, via three one-way clutches $F_0$, $F_1$, $F_2$.

The clutches $C_0$, $C_1$, $C_2$ and the brakes $B_0$, $B_1$, $B_2$, $B_3$ are in the form of, for example, multiple-disc clutches and band brakes each having one band or two bands that are wound in the opposite directions. These clutches $C_0$, $C_1$, $C_2$ and brakes $B_0$, $B_1$, $B_2$, $B_3$ are operated by respective hydraulic actuators. An electronic control unit 42 as described later controls the operations of these hydraulic actuators so that the automatic transmission 14 establishes a selected one of four forward speeds and one reverse speed having different speed ratios I (=the speed of rotation of the input shaft 20/the speed of rotation of the counter shaft 40) as shown in FIG. 2. In FIG. 2, "1st", "2nd", "3rd" and "O/D (overdrive)" represent forward-drive 1st-speed gear stage, 2nd-speed gear stage, 3rd-speed gear stage and 4th-speed gear stage, respectively. The speed ratio I becomes smaller stepwise as the automatic transmission 14 is shifted from the 1st-speed gear stage toward the 4th-speed gear stage. It is to be noted that the torque converter 12 and the automatic transmission 14 are constructed symmetrically with respect to the axes thereof, and the lower side of the axis of rotation of the input shaft 20 and the upper side of the axis of rotation of the counter shaft 40 are not illustrated in FIG. 1.

A hydraulic control circuit 44 shown in FIG. 1 includes a hydraulic control circuit for shift control, which is provided for controlling the gear stage of the automatic transmission 14, and a hydraulic control circuit for engagement control, which is provided for controlling engagement of the lock-up clutch 32. The hydraulic control circuit for shift control includes a first solenoid-operated valve 46 and a second solenoid-operated valve 48 which are driven, i.e., placed in the ON or OFF position, by solenoid No. 1 and solenoid No. 2, respectively, as well known in the art. In operation, the clutches and brakes are selectively actuated as indicated in FIG. 2, in accordance with the combination of the ON/OFF positions of the first and second solenoid-operated valves 46, 48, so as to establish a selected one of the four forward speeds and one reverse speed as described above.

Figure 3:
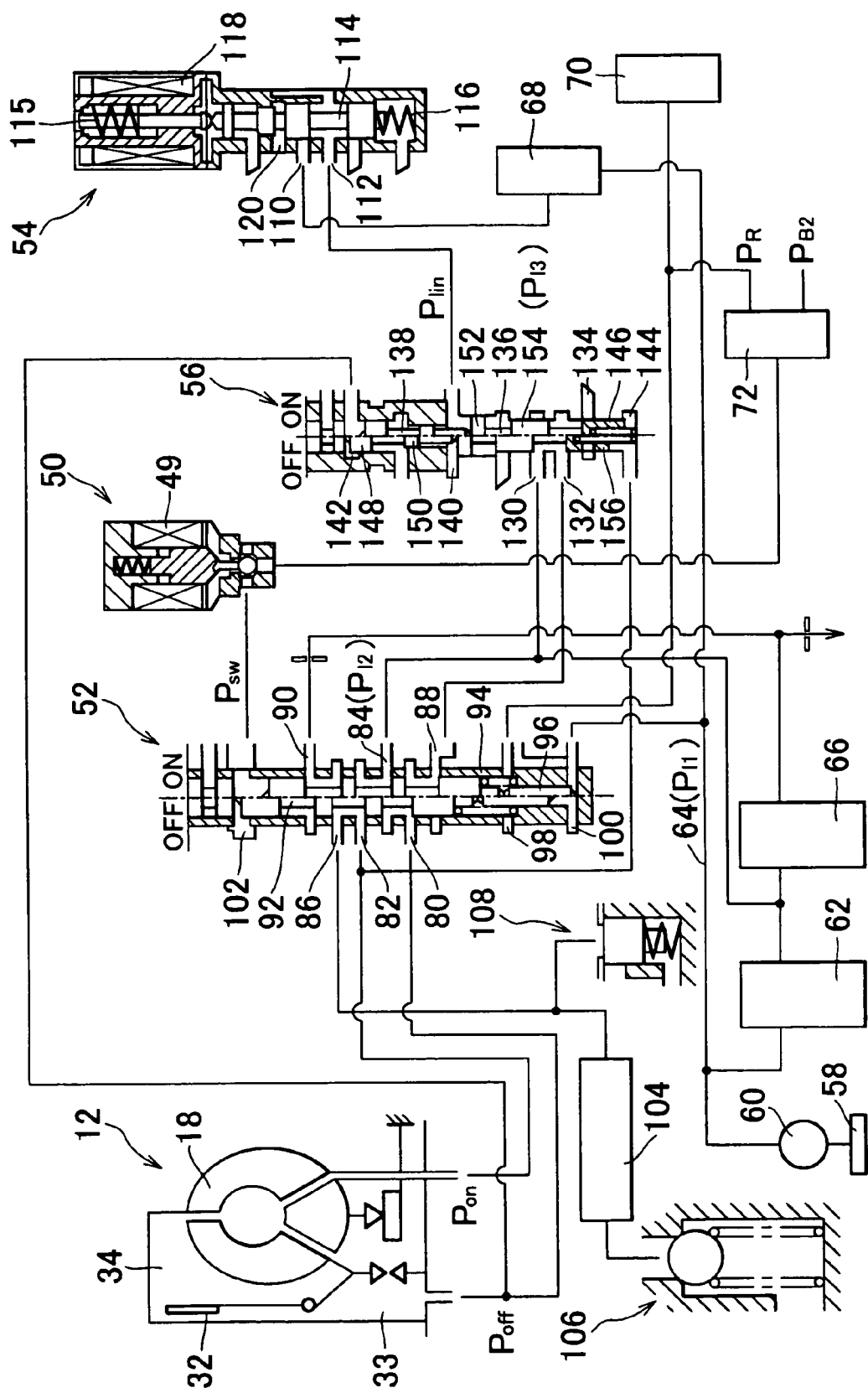
FIG. 3 is a view showing the construction of a principal portion of a hydraulic control circuit of FIG. 1.

The hydraulic control circuit for engagement control of the lock-up clutch 32 includes a third solenoid-operated valve 50, a clutch switching valve 52, a linear solenoid valve 54 and a slip control valve 56, as shown in FIG. 3 by way of example. The third solenoid-operated valve 50 is operated to the ON or OFF position by a switching solenoid 49 to generate a switching signal pressure $P_{SW}$. The clutch switching valve 52 is switched between the releasing position for placing the lock-up clutch 32 in the released state, and the engaging position for placing the lock-up clutch 32 in the engaged state, in accordance with the switching signal pressure $P_{SW}$. The linear solenoid valve 54 generates a signal pressure $P_{lin}$ for slip control according to drive current $I_{SLU}$ supplied from the electronic control unit 42. The slip control valve 56 controls the amount of slip of the lock-up clutch 32 by adjusting a pressure difference $\Delta P$ between the engaging side oil chamber 35 and the release side oil chamber 33 according to the slip control signal pressure $P_{lin}$ generated from the linear solenoid valve 54.

The hydraulic control circuit 44 includes a pump 60 operable to draw in hydraulic oil that has returned to a tank (not shown), via a strainer 58, and feed the hydraulic oil under pressure, as shown in FIG. 3. The pressure of the hydraulic oil fed under pressure from the pump 60 is regulated into a first line pressure $P_{l1}$ by an overflow type first regulating valve 62. The first regulating valve 62 generates the first line pressure $P_{l1}$ which increases in accordance with a throttle pressure generated by a throttle opening detection valve (not shown), and outputs the pressure $P_{l1}$ via a first line oil channel 64. A second regulating valve 66, which is an overflow type regulating valve, regulates the pressure of the hydraulic oil flowing from the first regulating valve 62, based on the throttle pressure, thereby to generate a second line pressure $P_{l2}$ corresponding to the output torque of the engine 10. A third regulating valve 68, which is a pressure reducing valve using the first line pressure $P_{l1}$ as an original pressure, generates a constant third line pressure $P_{l3}$. A manual valve 70 generates a R range pressure $P_R$ when a shift lever 196 shown in FIG. 1 is placed in the R (reverse) range. An OR valve 72 selects the higher one of the pressure $P_{B2}$ that actuates the brake $B_2$ and the R range pressure $P_R$, and generates the selected pressure.

The clutch switching valve 52 has a release side port 80 that communicates with the release side oil chamber 33 of the lock-up clutch 32, an engaging side port 82 that communicates with the engaging side oil chamber 34, an input port 84 to which the second line pressure $P_{l2}$ is supplied, a first discharge port 86 through which the hydraulic oil in the engaging side oil chamber 34 is discharged when the lock-up clutch 32 is released, a second discharge port 88 through which the hydraulic oil in the release side oil chamber 33 is discharged when the lock-up clutch 32 is engaged, and a supply port 90 to which a part of the hydraulic oil discharged from the second regulating valve 66 is supplied for cooling when the lock-up clutch 32 is engaged. The clutch switching valve 52 also has a spool 92 for switching the connection of these ports, a spring 94 that urges the spool 92 toward the OFF position, and a plunger 96 disposed to be able to abut on an end portion of the spool 92 adjacent to the spring 94. The clutch switching valve 52 further has an oil chamber 98 formed between the spool 92 and the plunger 96, which permits the R range pressure $P_R$ to be applied to the opposed end faces of the spool 92 and the plunger 96, an oil chamber 100 that receives the first line pressure $P_{l1}$ to be applied to the other end face of the plunger 96, and an oil chamber 102 that receives the switching signal pressure $P_{SW}$ from the third solenoid-operated valve 50 so that the signal pressure $P_{SW}$ is applied to the end face of the spool 92 remote from the spring 94 so as to generate thrust to bring the valve 52 into the ON position.

When the third solenoid-operated valve 50 is in a non-energized state (OFF state), a ball-like valve body of the valve 50 cuts off communication between the oil chamber 102 of the clutch switching valve 52 and the OR valve 72, and the oil chamber 102 is exposed to a drain pressure. When the third solenoid-operated valve 50 is in an energized state (ON state), the valve 50 communicates the oil chamber 102 with the OR valve 72, and applies the switching signal pressure $P_{SW}$ to the oil chamber 102. Namely, when the third solenoid-operated valve 50 is in the OFF state, the switching signal pressure $P_{SW}$ is not applied to the oil chamber 102, and the spool 92 is placed in the OFF position under the bias force of the spring 94 and the first line pressure $P_{l1}$ applied to the oil chamber 100, so that the input port 84 and the release side port 80 communicate with each other while the engaging side port 82 and the first discharge port 86 communicate with each other. As a result, the hydraulic pressure $P_{off}$ in the release side oil chamber 33 of the lock-up clutch 32 is increased to be higher than the hydraulic pressure $P_{on}$ in the engaging side oil chamber 34, and the lock-up clutch 32 is released. At the same time, the hydraulic oil in the engaging side oil chamber 34 is discharged into a drain via the first discharge port 86, an oil cooler 104 and a check valve 106. A relief valve 108 for avoiding an excessive pressure increase is provided between the first discharge port 86 and the oil cooler 104.

When the third solenoid-operated valve 50 is in the ON state, on the other hand, the switching signal pressure $P_{SW}$ is applied to the oil chamber 102, and the spool 92 is placed in the ON position against the bias force of the spring 94 and the first line pressure $P_{l1}$ applied to the oil chamber 100, so that the input port 84 and the engaging side port 82, the releasing side port 80 and the second discharge port 88, and the supply port 90 and the first discharge port 86 communicate with each other, respectively. As a result, the hydraulic pressure $P_{on}$ in the engaging side oil chamber 34 of the lock-up clutch 32 is increased to be higher than the hydraulic pressure $P_{off}$ in the release side oil chamber 33, and the lock-up clutch 32 is engaged. At the same time, the hydraulic oil in the release side oil chamber 33 is discharged into a drain via the second discharge port 88 and the slip control valve 56.

Figure 4:
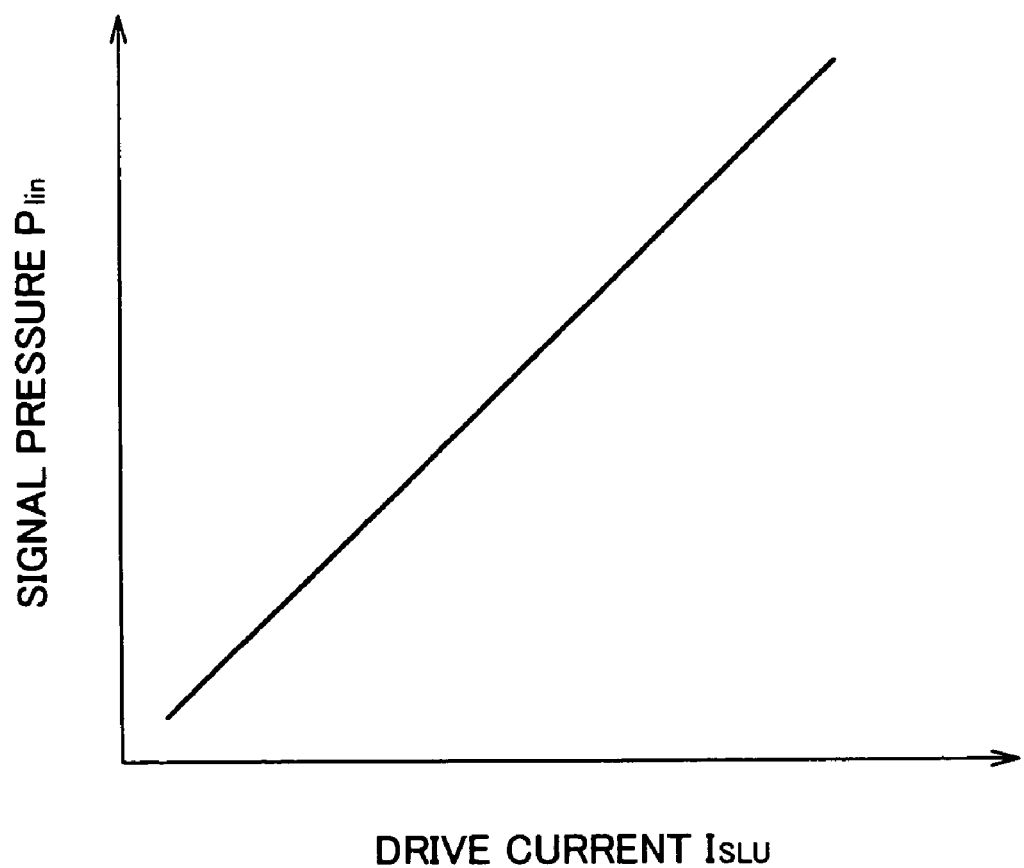
FIG. 4 is a view showing an output characteristic of a linear solenoid valve provided in the hydraulic control circuit of FIG. 3.

The linear solenoid valve 54 is a pressure reducing valve using the constant third line pressure $P_{l3}$ generated by the third regulating valve 68 as an original pressure. The linear solenoid valve 54 produces a slip control signal pressure $P_{lin}$ which increases with drive current $I_{SLU}$ from the electronic control unit 42, as shown in FIG. 4, and applies the slip control signal pressure $P_{lin}$ to the slip control valve 56. The linear solenoid valve 54 has a supply port 110 to which the third line pressure $P_{l3}$ is supplied, an output port 112 that outputs the slip control signal pressure $P_{lin}$, and a spool 114 that opens or closes these ports. The linear solenoid valve 54 also has a spring 115 that urges the spool 114 in a valve-closing direction, a spring 116 that urges the spool 114 in a valve-opening direction by using smaller thrust than the spring 115, a solenoid 118 for slip control, which drives the spool 114 in the valve-opening direction according to the drive current $I_{SLU}$, and an oil chamber 120 that receives a feedback pressure (slip control signal pressure $P_{lin}$) for generating thrust on the spool 114 in the valve-closing direction. The spool 114 is operated to a position at which the force generated in the valve-opening direction by the solenoid 118 and the spring 116 is balanced with the force generated in the valve-closing direction by the spring 115 and the feedback pressure.

The slip control valve 56 has a line pressure port 130 to which the second line pressure $P_{l2}$ is supplied, a receiving port 132 that receives the hydraulic oil in the release side oil chamber 33 of the lock-up clutch 32 which is discharged from the second discharge port 88 of the clutch switching valve 52, and a drain port 134 for discharging the hydraulic oil received by the receiving port 132. The slip control valve 56 also has a spool 136 that is movable between the first position (the lower position in FIG. 3) in which the receiving port 132 and the drain port 134 communicate with each other, and the second position (the upper position in FIG. 3) in which the receiving port 132 and the line pressure port 130 communicate with each other, and a plunger 138 disposed to be able to abut on the spool 136 so as to urge the spool 136 toward the first position. The slip control valve 56 further has a signal pressure oil chamber 140 that receives the slip control signal pressure $P_{lin}$ so that the slip control signal pressure $P_{lin}$ is applied to the plunger 138 and the spool 136 so as to generate thrust on the plunger 138 and the spool 136 in directions in which the plunger 138 and the spool 136 are spaced apart from each other, and an oil chamber 142 that receives the hydraulic pressure $P_{off}$ in the release side oil pressure 33 of the lock-up clutch 32 so that the hydraulic pressure $P_{off}$ is applied to the plunger 138 so as to generate thrust on the plunger 138, and the spool 136, in a direction toward the first position. The slip control valve 56 further has an oil chamber 144 that receives the hydraulic pressure $P_{on}$ in the engaging side oil chamber 34 of the lock-up clutch 32 so that the hydraulic pressure $P_{on}$ is applied to the spool 136 so as to generate thrust on the spool 136 in a direction toward the second position, and a spring 146 received in the oil chamber 144 for urging the spool 136 toward the second position. In operation of the slip control valve 56, when the spool 136 is in the first position, the receiving port 132 and the drain port 134 communicate with each other, and the hydraulic oil in the release side oil chamber 33 of the lock-up clutch 32 is discharged so that a pressure difference $\Delta P$ (=$P_{on}$−$P_{off}$) between the engaging side oil chamber 34 of the lock-up clutch 32 and the release side oil chamber 33 is increased. When the spool 136 is in the second position, on the other hand, the receiving port 132 and the line pressure port 130 communicate with each other, and the second line pressure $P_{l2}$ is supplied to the release side oil chamber 33 of the lock-up clutch 32 so that the pressure difference $\Delta P$ is reduced.

The plunger 138 is formed with a first land 148 having a cross-sectional area $A_1$ and a second land 150 having a cross-sectional area $A_2$ smaller than the cross-sectional area $A_1$, such that the first land 148 and the second land 150 are arranged in this order as viewed from the oil chamber 142. The spool 136 is formed with a third land 152 having a cross-sectional area $A_3$, a fourth land 154 having a cross-sectional area $A_4$ that is smaller than the cross-sectional area $A_3$ and is equal to the cross-sectional area $A_1$ of the first land 148, and a fifth land 156 having a cross-sectional area $A_5$ that is equal to the cross-sectional area $A_1$, such that the third, fourth and fifth lands 152, 154, 156 are arranged in this order as viewed from the signal pressure oil chamber 140. The cross-sectional areas of these lands have a relationship of $A_3 > A_1$ (=$A_4$=$A_5$)>$A_2$. Accordingly, when the clutch switching valve 52 is in the ON position, and the slip control signal pressure $P_{lin}$ is relatively small such that the relationship as indicated by the following expression (1) is satisfied, the plunger 138 and the spool 136 are in contact with each other and move with each other as a unit, and the pressure difference $\Delta P$ between the engaging side oil chamber 34 and the release side oil chamber 33 of the lock-up clutch 32 varies with the slip control signal pressure $P_{lin}$. This pressure difference $\Delta P$ changes at a relatively small rate of ($A_3$−$A_2$)/$A_1$ relative to the slip control signal pressure $P_{lin}$, according to the following expression (2). In the expression (2), $F_s$ represents the bias force of the spring 146.

$$A_1 \cdot P_{off} \geq A_2 \cdot P_{lin} \quad (1)$$

$$\Delta P = P_{on} - P_{off} = [(A_3 - A_2)/A_1]P_{lin} - F_s/A_1 \quad (2)$$

Figure 5:
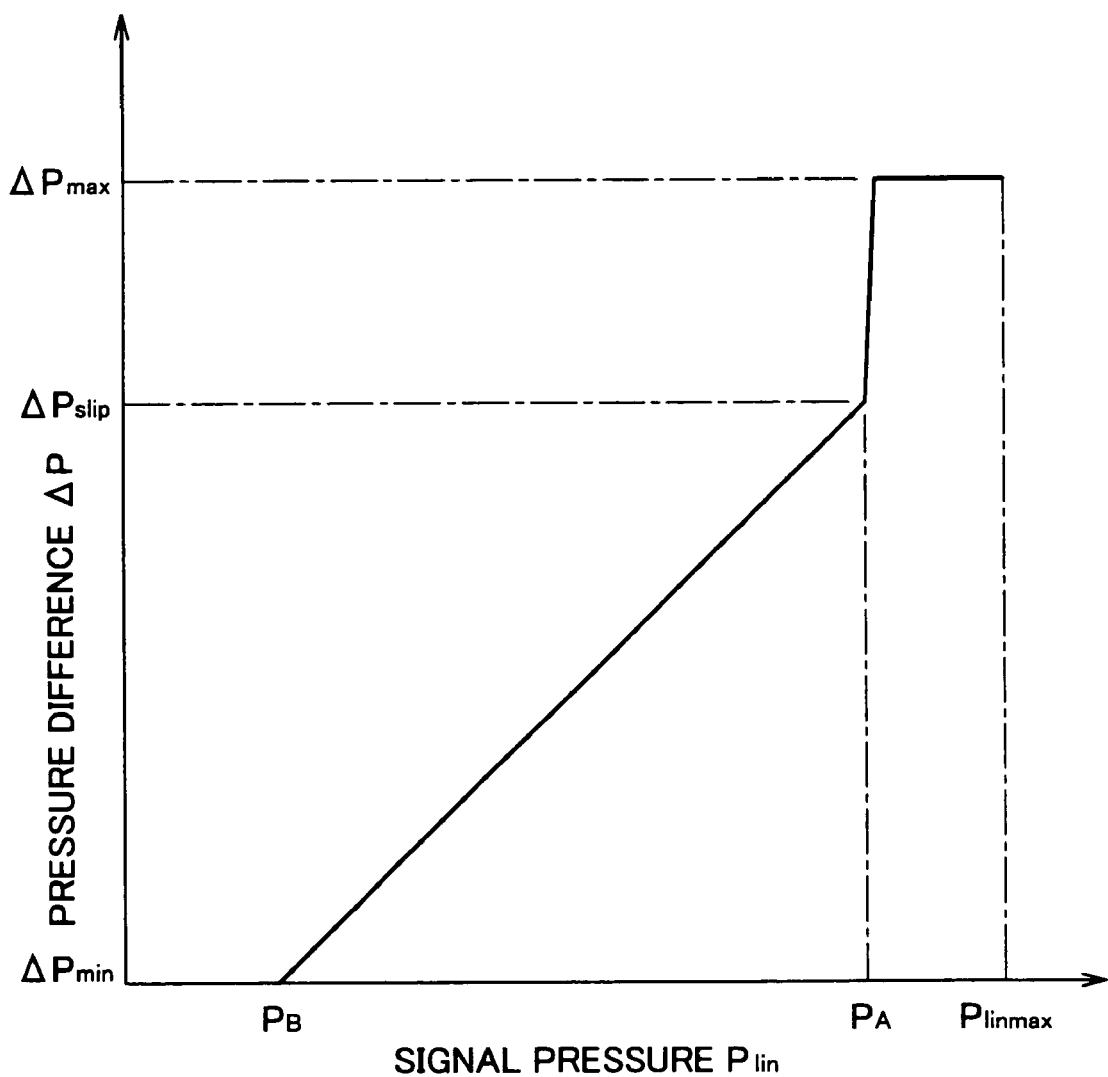
FIG. 5 is a view showing the relationship between the signal pressure generated by the linear solenoid valve of FIG. 4 and the pressure difference between an engaging side oil chamber and a release side oil chamber of a lock-up clutch.

If the slip control signal pressure $P_{lin}$ becomes greater than a predetermined value $P_A$, the relationship as indicated by the following expression (3) is satisfied. The value $P_A$ is determined in advance so as to provide a range $\Delta P_{slip}$ of change of the pressure difference $\Delta P$ that is sufficiently large for slip control of the lock-up clutch 32, and the above-described cross-sectional areas and other dimensions of the slip control valve 56 are set so that the relationship of the expression (3) is satisfied when the slip control signal pressure $P_{lin}$ becomes equal to this value $P_A$. When the slip control signal pressure $P_{lin}$ is greater than the predetermined value $P_A$ and the relationship of the expression (3) is satisfied, therefore, the plunger 138 and the spool 136 are spaced apart from each other, and the spool 136 is moved so as to satisfy the following expression (4). In the condition where the spool 136 is moved so as to satisfy the expression (4), however, the receiving port 132 and drain port 134 of the slip control valve 56 communicate with each other, and the hydraulic pressure $P_{off}$ in the release side oil chamber 33 of the lock-up clutch 32 is further reduced down to the atmospheric pressure. As a result, the pressure difference $\Delta P$ becomes equal to $\Delta P_{max}$ ($\Delta P = \Delta P_{max} = P_{on}$), and the lock-up clutch 32 is fully engaged. In FIG. 5, the solid line indicates changes in the pressure difference $\Delta P$ resulting from the operation of the slip control valve 56, relative to the slip control signal pressure $P_{lin}$.

$$A_1 \cdot P_{off} < A_2 \cdot P_{lin} \quad (3)$$

$$A_3 \cdot P_{lin} = A_4 \cdot P_{on} + F_s \quad (4)$$

If the slip control signal pressure $P_{lin}$ is reduced to be equal to or less than a predetermined value $P_B$ at which the following expression (5) is satisfied, the pressure difference $\Delta P$ becomes equal to $\Delta P_{min}$ ($\Delta P = \Delta P_{min} = 0$), as shown in FIG. 5, and the lock-up clutch 32 is released even though the clutch switching valve 52 is in the ON position.

$$A_3 \cdot P_{on} > A_3 \cdot P_{lin} \quad (5)$$

Referring again to FIG. 1, the electronic control unit 42 is a microcomputer including CPU 182, ROM 184, RAM 184, input/output interfaces (not shown), and so forth. The power transmitting system of FIG. 1 includes a throttle sensor 188 for detecting the opening angle of a throttle valve 187 that is provided in an intake pipe of the engine 10 and is opened and closed through the operation of an accelerator pedal (not shown), an engine speed sensor 190 for detecting the speed of revolution of the engine 10, an input shaft speed sensor 192 for detecting the rotational speed of the input shaft 20 of the automatic transmission 14, a counter shaft speed sensor 194 for detecting the rotational speed of the counter shaft 40 of the automatic transmission 14, and a lever position sensor 198 for detecting the position to which the shift lever 196 is operated, namely, a selected one of the L, S, D, N, R and P ranges. The electronic control unit 42 receives, from these sensors, a signal indicative of the throttle opening TAP, a signal indicative of the engine speed $N_e$ (i.e., the speed $N_P$ of rotation of the pump impeller 18 or the input rotational speed of the lock-up clutch 32), a signal indicative of the input shaft speed $N_{in}$ (i.e., the speed $N_T$ of rotation of the turbine wheel 22 or the output rotational speed of the lock-up clutch 32), a signal indicative of the output shaft speed $N_{out}$, and a signal indicative of the selected position $P_s$ of the shift lever 196. The electronic control unit 42 also receives a signal indicative of the oil temperature THO from an oil temperature sensor 199 for detecting the oil temperature of the hydraulic oil supplied to the torque converter 12 and the automatic transmission 14. The CPU 182 of the electronic control unit 42 processes the input signals according to programs stored in advance in the ROM 184, utilizing the temporary storage function of the RAM 186, and controls the first solenoid-operated valve 46, second solenoid-operated valve 48, third solenoid-operated valve 50 and the linear solenoid valve 54, so as to carry out shift control of the automatic transmission 14 and engagement control of the lock-up clutch 32.

In the shift control, the electronic control unit 42 selects a shift diagram corresponding to the actual gear stage of the automatic transmission 14 from a plurality of shift diagrams stored in advance in the ROM 184, and determines a gear stage from the selected shift diagram, based on the running conditions of the vehicle, e.g., the throttle opening TAP and the vehicle speed calculated from the output shaft speed $N_{out}$. Then, the first solenoid-operated valve 46 and the second solenoid-operated valve 48 are driven so as to provide the gear stage thus determined, so that the operating states of the clutches $C_0$, $C_1$, $C_2$ and the brakes $B_0$, $B_1$, $B_2$, $B_3$ of the automatic transmission 14 are controlled so as to establish one of the four forward speeds and one reverse speed. FIG. 2 shows gear stages to be established in each shift range of the shift lever 196, and the operating states of the solenoids, clutches, brakes and one-way clutches when each of the gear stages is established. In FIG. 2, "O" in the columns of the solenoids No. 1, No. 2 indicates that the solenoid is in the energized state, and "X" in the same columns indicates that the solenoid is in the non-energized state. Also, "O" in the columns of the clutches and brakes represents the engaged state, and the blank in the same columns represents the non-engaged or released state. Furthermore, "O" in the columns of the one-way clutches indicates that the one-way clutch is placed in the engaged state when power is transmitted from the engine 10 to the driving wheels, and the blank in the same columns indicates that the one-way clutch is in the non-engaged state.

Figure 6:
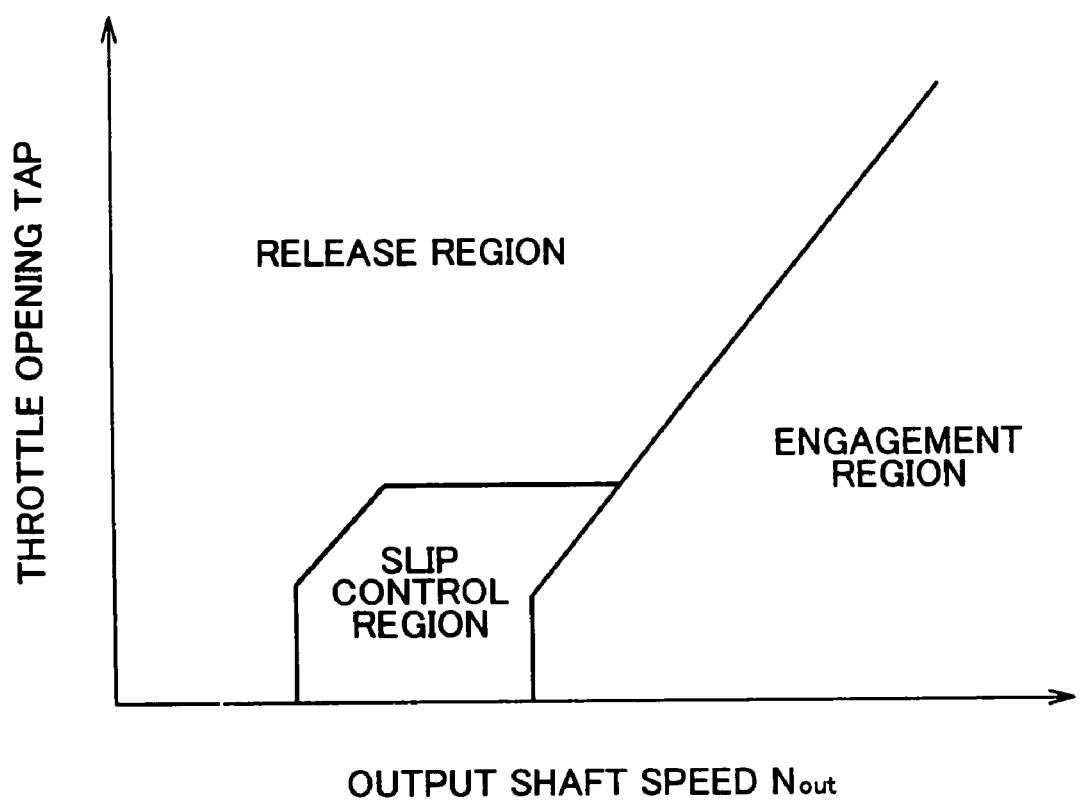
FIG. 6 is a view showing the relationship between the running conditions of the vehicle and the coupling condition of the lock-up clutch, which relationship is stored in an electronic control unit shown in FIG. 1.

In the engagement control of the lock-up clutch 32, the electronic control unit 42 determines which one of the release region, slip control region and the engagement region the lock-up clutch 32 is to be placed in, from the relationship stored in advance in the ROM 184 and shown in FIG. 6, based on the running conditions of the vehicle, e.g., the output shaft speed (vehicle speed) $N_{out}$ and the throttle opening TAP. The relationship of FIG. 6 is selected from a plurality of relationships stored in advance, according to the actual gear stage. In FIG. 6, the slip (flexible) control region is provided in a small throttle-opening region on the release-region side (left-hand side in FIG. 6) of the boundary between the engagement region and the release region. The lock-up clutch 32, when placed in the slip control region, absorbs torque variations of the engine 10 while maintaining the clutch coupling effect so as to improve the fuel economy as much as possible without deteriorating the drivability.

When it is judged from the running conditions of the vehicle that the lock-up clutch 32 is to be in the engagement region shown in FIG. 6, the third solenoid-operated valve 50 is energized to place the clutch switching valve 52 in the ON state, and at the same time the drive current $I_{SLU}$ fed to the linear solenoid valve 54 is set to the minimum drive current (rated value), so that the lock-up clutch 32 is engaged. When it is judged from the running conditions of the vehicle that the lock-up clutch 32 is to be in the release region shown in FIG. 6, the third solenoid-operated valve 50 is dienergized to place the clutch switching valve 52 in the OFF state, so that the lock-up clutch 32 is released irrespective of the drive current $I_{SLU}$ fed to the linear solenoid valve 54. When it is judged from the running conditions of the vehicle that the lock-up clutch 32 is to be in the slip control region shown in FIG. 6, the third solenoid-operated valve 50 is energized to place the clutch switching valve 52 in the ON state, and at the same time the drive current $I_{SLU}$ fed to the linear solenoid valve 54 is adjusted according to, for example, the following expression (6). Namely, a feed-forward control valve $I_{F/F}$ and a feedback control valve $I_{F/B}$ are determined so as to eliminate a deviation $\Delta N$ ($=N_{SLP}-TN_{SLP}$) of the actual slip speed $N_{SLIP}$ ($=N_e-N_T$) from the steady-state target slip speed $TN_{SLP}$ which is determined according to, for example, the running resistance of the vehicle. The drive current $I_{SLU}$ to be fed to the linear solenoid valve 54 is calculated by adding a learned value $I_{LE}$ to the sum of the feed-forward control value $I_{F/F}$ and the feedback control value $I_{F/B}$, and the thus calculated drive current $I_{SLU}$ is generated.

$$I_{SLU}=I_{F/F}+I_{F/B}+I_{LE} \quad (6)$$

Figure 7:
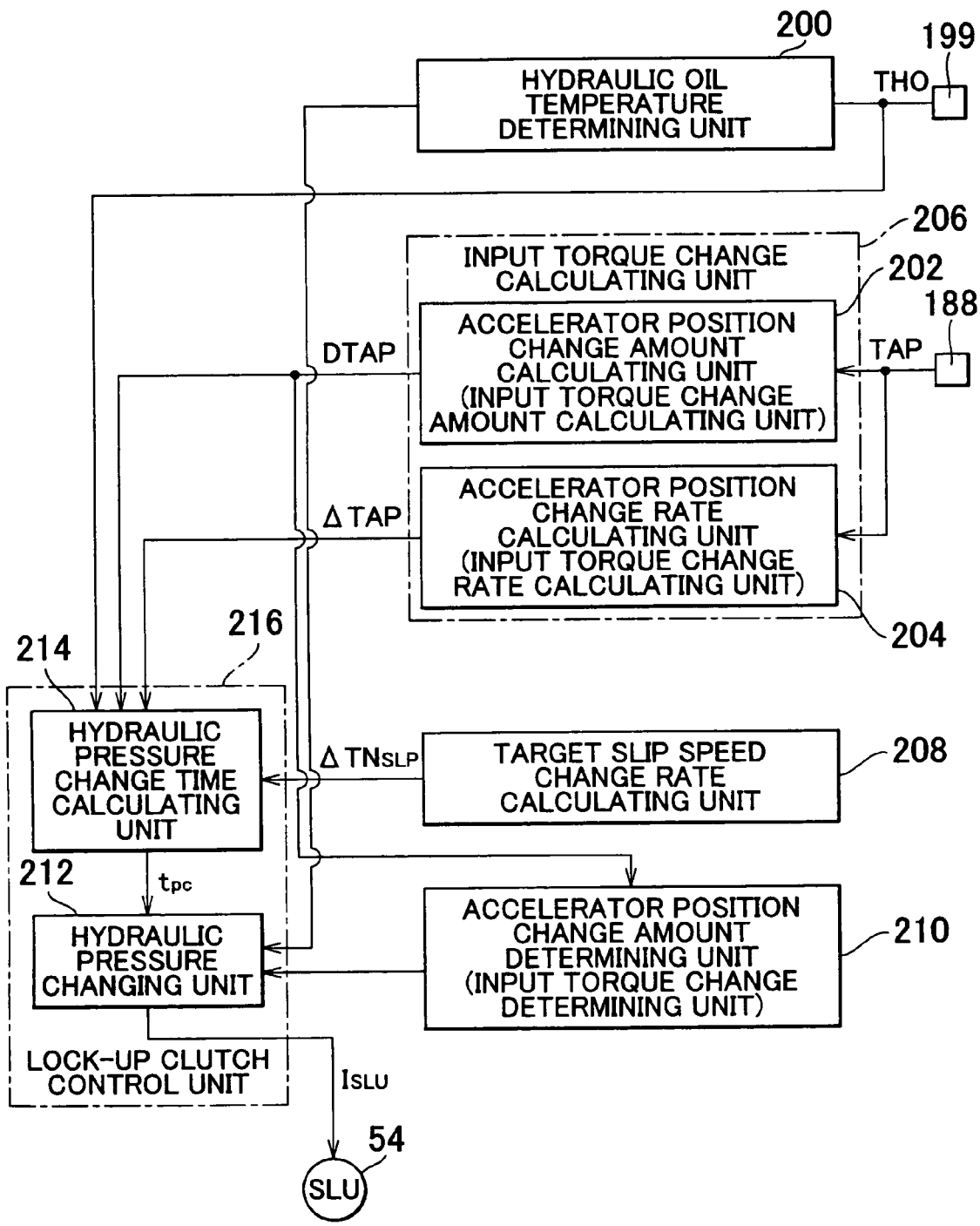
FIG. 7 is a functional block diagram explaining the principal control functions of flexible lock-up control performed by the electronic control unit of FIG. 1.

FIG. 7 is a functional block diagram explaining the principal control functions of the electronic control unit 42 for controlling the lock-up clutch 32. A hydraulic oil temperature determining unit 200 shown in FIG. 7 determines whether the oil temperature THO detected by the oil temperature sensor 199 is lower than a predetermined temperature $THO_{ts}$.

Referring to FIG. 7, an accelerator position change amount calculating unit 202 calculates the amount of change DTAP of the throttle opening TAP detected by the throttle sensor 188 within a predetermined time. An accelerator position change rate calculating unit 204 calculates the rate of change $\Delta TAP$ of the throttle opening TAP detected by the throttle sensor 188. During running of the vehicle, the throttle opening TAP determines the speed $N_e$ of revolution of the engine 10, and thus determines the input torque of the lock-up clutch 32. Thus, the accelerator position change amount calculating unit 202 and the accelerator position change rate calculating unit 204 may also be called "input torque change amount calculating unit" and "input torque change rate calculating unit", respectively. An input torque change calculating unit 206 includes the accelerator position change amount calculating unit 202 and the accelerator position change rate calculating unit 204, and calculates changes in the input torque of the lock-up clutch 32.

A target slip speed change rate calculating unit 208 calculates the rate of change $\Delta TN_{SLP}$ of the target slip speed $TN_{SLP}$ as a target value of the slip speed $N_{SLP}$. Since the target slip speed $TN_{SLP}$ varies in accordance with changes in the running resistance of the vehicle, the target slip speed change rate calculating unit 208 may also be called "running resistance change calculating unit" that calculates changes in the running resistance of the vehicle.

An accelerator position change amount determining unit 210 determines whether the amount of change DTAP of the throttle opening TAP calculated by the accelerator position change amount calculating unit 202 within the predetermined time is larger than a predetermined value $DTAP_{ts}$. Since the throttle opening TAP is correlated with the input torque of the lock-up clutch 32 during running of the vehicle, as described above, the accelerator position change amount determining unit 210 may also be called "input torque change determining unit" that determines whether a change in the input torque calculated by the input torque change calculating unit 206 is larger than a predetermined value.

A hydraulic pressure changing unit 212 changes the hydraulic pressure of the hydraulic oil supplied to the lock-up clutch 32 to a certain pressure level for a predetermined length of time $t_{PC}$ when the hydraulic oil temperature determining unit 200 determines that the oil temperature THO of the hydraulic oil is lower than the predetermined temperature $THO_{ts}$, and the accelerator position change amount determining unit 210 determines that the amount of change DTAP of the throttle opening TAP within the predetermined time is larger than the predetermined value $DTAP_{ts}$. For example, the drive current $I_{SLU}$ fed to the linear solenoid valve 54 is controlled to a value calculated according to the following expression (7) for the predetermined time $t_{PC}$. In the expression (7), G represents gain, and gain $G^+$ applied in the case where the change in the throttle opening TAP in the predetermined time is positive and gain $G^-$ applied in the case where the change is negative are determined in advance. Preferably, the drive current $I_{SLU}^+$ obtained by using gain $G^+$ causes the output port 112 of the linear solenoid valve 54 to temporarily output the signal pressure $P_{lin}$ that makes the pressure difference $\Delta P$ equal to the maximum value $\Delta P_{max}$, and the drive current $I_{SLU}^-$ obtained by using gain $G^-$ causes the output port 112 of the linear solenoid valve 54 to temporarily output the signal pressure $P_{lin}$ that makes the pressure difference $\Delta P$ equal to the minimum value $\Delta P_{min}$.

$$I_{SLU}=G(I_{F/F}+I_{F/B}+I_{LE}) \quad (7)$$

Figure 8:
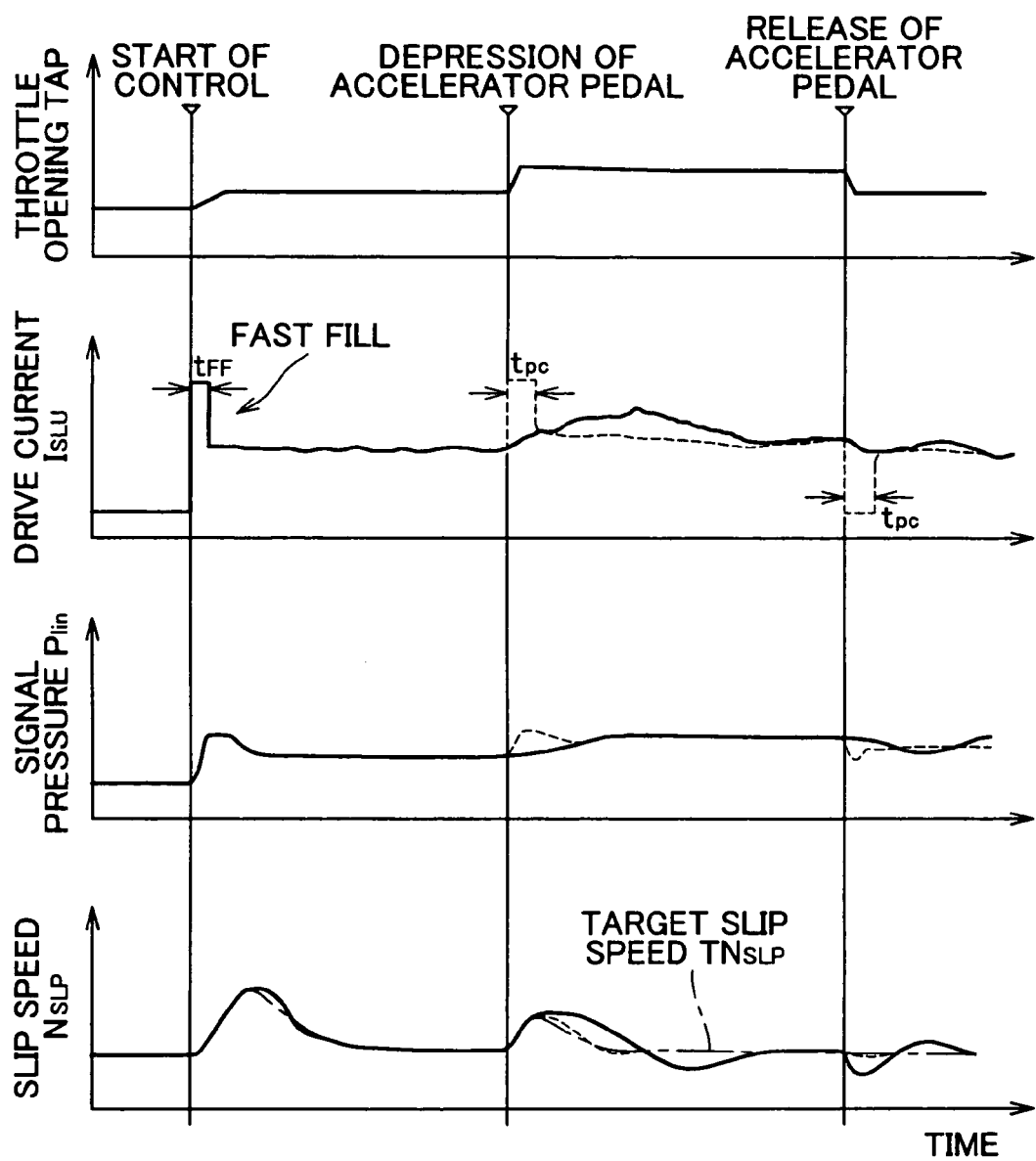
FIG. 8 is a time chart illustrating flexible control for the lock-up clutch of FIG. 1.

FIG. 8 is a time chart showing flexible control of the lock-up clutch 32. In FIG. 8, solid lines indicate the case where the control shown in FIG. 7 is not carried out, and broken lines indicate the case where the control shown in FIG. 7 is carried out. In the time chart of the slip speed $N_{SLP}$, the one-dot chain line denotes the target slip speed $TN_{SLP}$. When the lock-up clutch 32 shifts from the release region to the slip control region as shown in FIG. 6, for example, upon depression of the accelerator pedal (not shown), and the flexible lock-up control is started, well-known fast fill control is performed in which the hydraulic pressure of the hydraulic oil supplied to the lock-up clutch 32 is changed to a predetermined level for a predetermined time $t_{FF}$. The control shown in FIG. 7 is performed in a manner similar to the fast fill control. Namely, if the amount of depression of the accelerator pedal is relatively rapidly increased, i.e., the input torque is relatively rapidly increased, when the temperature of the hydraulic oil is low, the hydraulic pressure of the lock-up clutch 32 is temporarily controlled to a relatively high, predetermined pressure. If the amount of depression of the accelerator pedal is relatively rapidly reduced, i.e., the input torque is relatively rapidly reduced, on the other hand, the hydraulic pressure of the lock-up clutch 32 is temporarily controlled to a relatively low, predetermined pressure. As is apparent from FIG. 8, in the case where the control shown in FIG. 7 is not carried out, if the amount of depression of the accelerator pedal is relatively rapidly increased or reduced, hunting or fluctuation of the slip speed $N_{SLIP}$ may occur due to feedback control performed in such a way that the resulting slip speed $N_{SLIP}$ largely deviates from the target slip speed $TN_{SLP}$. In the case where the control shown in FIG. 7 is carried out, on the other hand, the hydraulic pressure of the hydraulic oil supplied to the lock-up clutch 32 is changed to the predetermined level for a predetermined length of time $t_{PC}$, whereby the response is improved, and the above-described problem, such as hunting, can be favorably suppressed or avoided.

Figure 11:
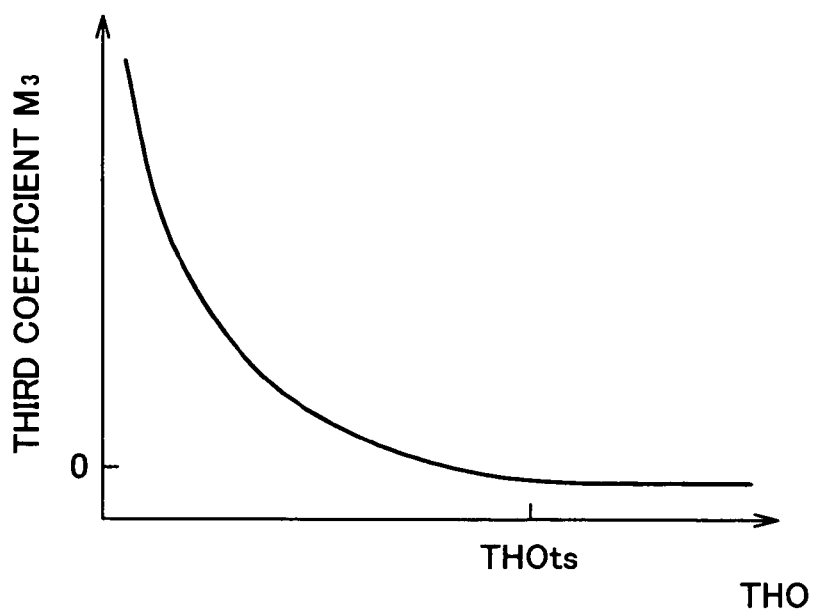
FIG. 11 is a map for obtaining a third coefficient from the oil temperature of the hydraulic oil.
Figure 12:
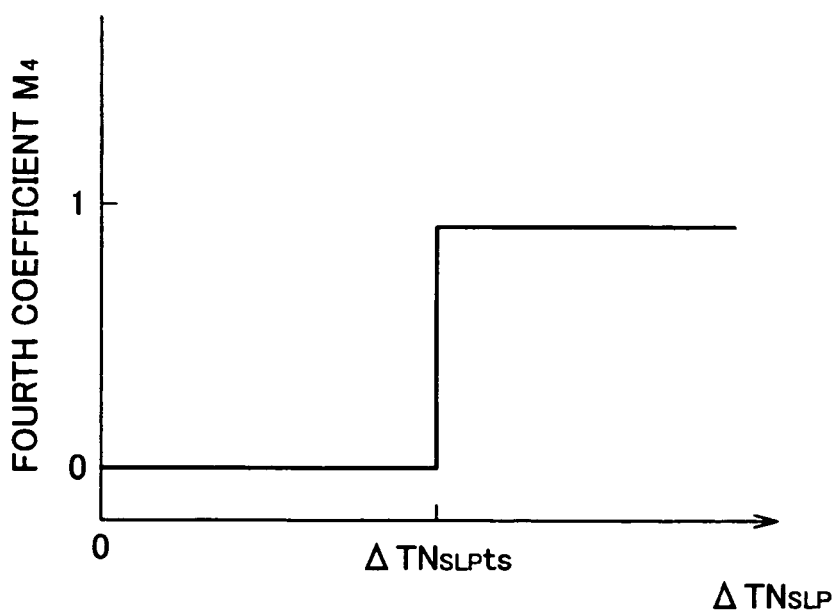
FIG. 12 is a map for obtaining a fourth coefficient from the rate of change of the target slip speed.

Referring again to FIG. 7, a hydraulic pressure change time calculating unit 214 calculates the predetermined time $t_{PC}$ for which the hydraulic pressure of the hydraulic oil is changed by the hydraulic pressure changing unit 212. For example, the hydraulic pressure change time calculating unit 214 calculates the predetermined time $t_{PC}$ according to the following expression (8), based on a first coefficient $M_1$, a second coefficient $M_2$, a third coefficient $M_3$ and a fourth coefficient $M_4$. The first coefficient $M_1$ is obtained from the map of FIG. 9, based on the amount of change DTAP of the throttle opening TAP within the predetermined time, which is calculated by the accelerator position change amount calculating unit 202. The second coefficient $M_2$ is obtained from the map of FIG. 10, based on the rate of change $\Delta TAP$ of the throttle opening TAP calculated by the accelerator position change rate calculating unit 204. The third coefficient $M_3$ is obtained from the map of FIG. 11, based on the hydraulic oil temperature THO detected by the oil temperature sensor 199, and the fourth coefficient $M_4$ is obtained from the map of FIG. 12, based on the rate of change $\Delta TN_{SLP}$ of the target slip speed $TN_{SLP}$ calculated by the target slip speed change rate calculating unit 208. As is apparent from the expression (8) and FIGS. 9–12, the predetermined time $t_{PC}$ becomes equal to zero and no change of the hydraulic pressure is made in the cases where the amount of change DTAP of the throttle opening TAP within the predetermined time is smaller than the predetermined value $DTAP_{ts}$, where the rate of change $\Delta TAP$ of the throttle opening TAP is smaller than a predetermined value $\Delta TAP_{ts}$, where the oil temperature THO of the hydraulic oil is higher than the predetermined temperature $THO_{ts}$, and where the rate of change $\Delta TN_{SLP}$ of the target slip speed $TN_{SLP}$ is smaller than a predetermined value $\Delta TN_{SLPts}$.

$$t_{PC}=M_1 \cdot M_2 \cdot M_3 \cdot M_4 \quad (8)$$

As shown in FIG. 7, a lock-up clutch control unit 216 includes the hydraulic pressure changing unit 212 and the hydraulic pressure change time calculating unit 214. The lock-up clutch control unit 216 determines which one of the release region, slip control region and the engagement region the lock-up clutch 32 is to be placed in, based on the running conditions of the vehicle, and performs control for the region thus determined. When the hydraulic oil temperature determining unit 200 and the input torque change determining unit 210 make positive determinations, the hydraulic pressure changing unit 212 and the hydraulic pressure change time calculating unit 214 execute flexible lock-up control.

Figure 13:
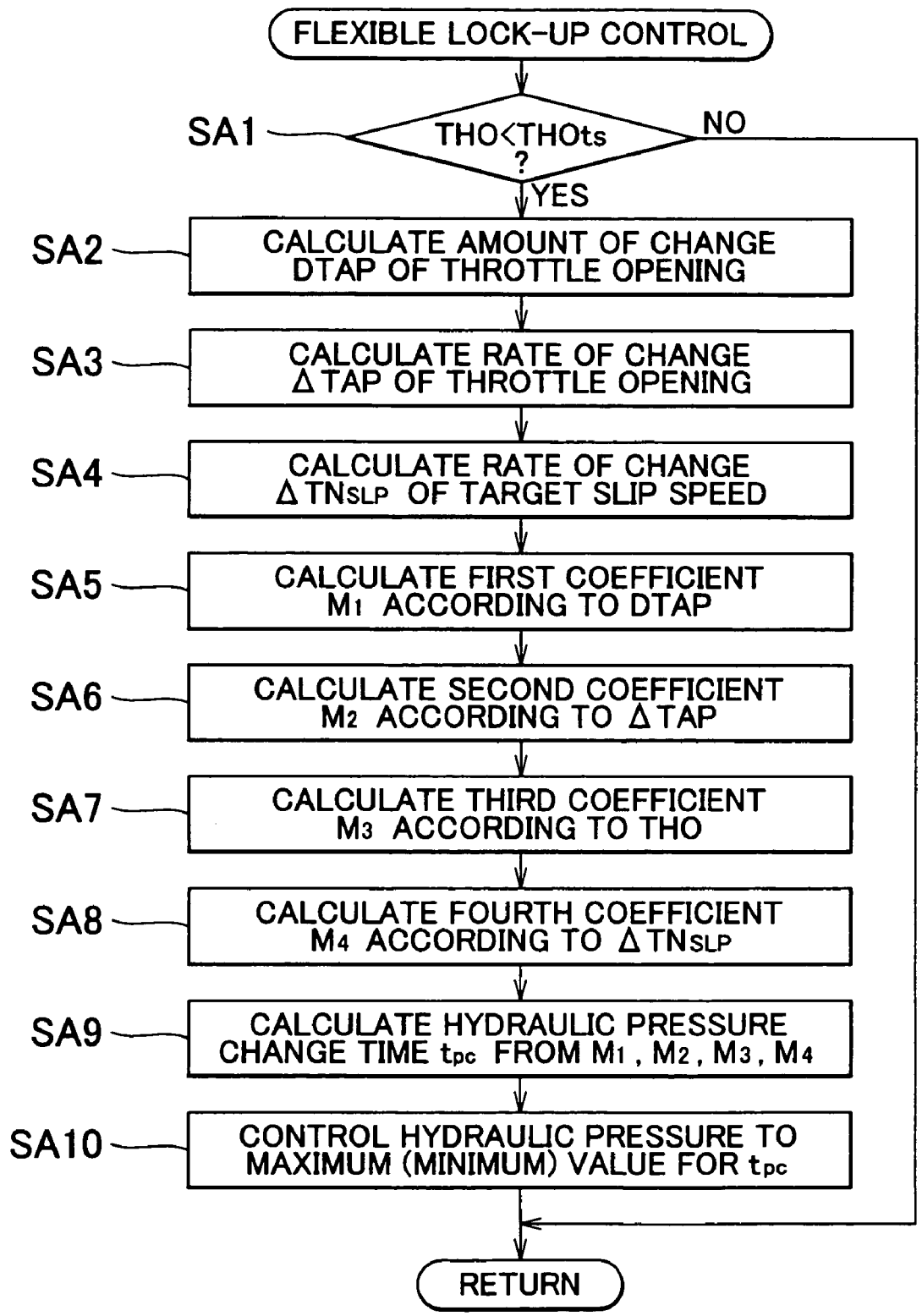
FIG. 13 is a flowchart explaining a principal part of a flexible lock-up control routine executed by the electronic control unit of FIG. 1.

FIG. 13 is a flowchart explaining a principal part of a flexible lock-up control routine executed by the electronic control unit 42. The control routine of FIG. 13 is repeatedly executed at certain time intervals. Initially, it is determined in step SA1 corresponding to the hydraulic oil temperature determining unit 200 whether the hydraulic oil temperature THO detected by the oil temperature sensor 199 is lower than the predetermined temperature $THO_{ts}$. If a negative determination is made in step SA1, the present routine is finished. If an affirmative determination is made in step SA1, the amount of change DTAP of the throttle opening TAP detected by the throttle sensor 188 within the predetermined time is calculated in step SA2 corresponding to the accelerator position change amount calculating unit 202, and the rate of change ΔTAP of the throttle opening TAP detected by the throttle sensor 188 is calculated in step SA3 corresponding to the accelerator position change rate calculating unit 204. Then, the rate of change $\Delta TN_{SLP}$ of the target slip speed $TN_{SLP}$ is calculated in step SA4 corresponding to the target slip speed change rate calculating unit 208.

Figure 9:
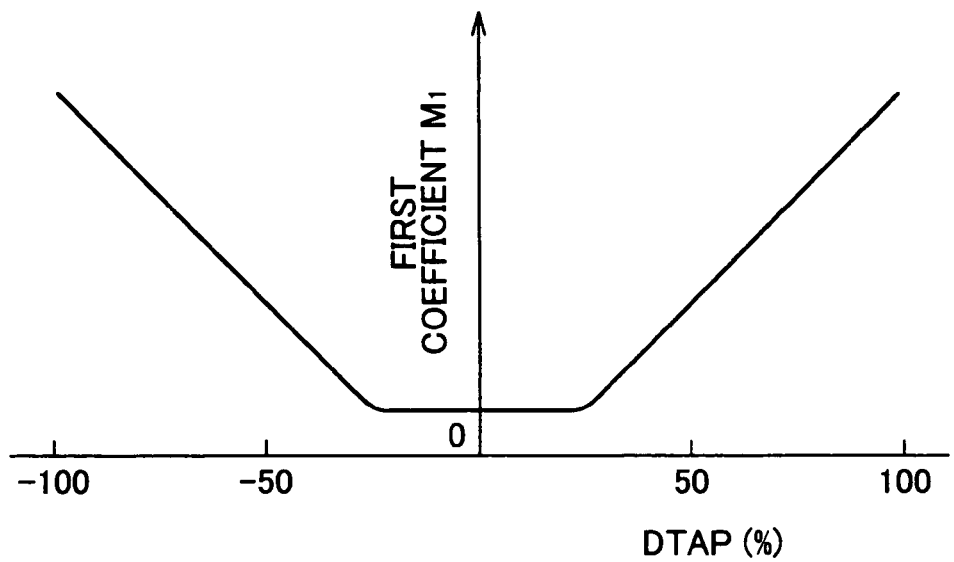
FIG. 9 is a map for obtaining a first coefficient from the amount of change of the throttle opening.
Figure 10:
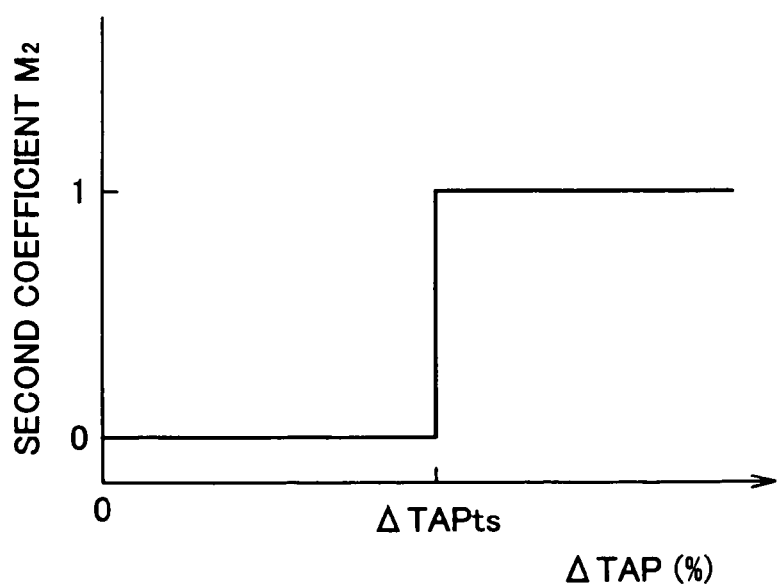
FIG. 10 is a map for obtaining a second coefficient from the rate of change of the throttle opening.

Next, the first coefficient $M_1$ is obtained from the map of FIG. 9 in step SA5 based on the amount of change DTAP of the throttle opening TAP within the predetermined time, which is calculated in the above step SA2, and the second coefficient $M_2$ is obtained from the map of FIG. 10 in step SA6 based on the rate of change ΔTAP of the throttle opening TAP calculated in the above step SA3. Also, the third coefficient $M_3$ is obtained from the map of FIG. 11 in step SA7 based on the oil temperature THO of the hydraulic oil, and the fourth coefficient $M_4$ is obtained from the map of FIG. 12 in step SA8 based on the rate of change $\Delta TN_{SLP}$ of the target slip speed $TN_{SLP}$ calculated in the above step SA4. Subsequently, the hydraulic pressure change time $t_{PC}$ is calculated in step SA9 according to the above-indicated expression (8), based on the coefficients $M_1$ through $M_4$ obtained in the above steps SA5 through SA8. In step SA10 corresponding to the hydraulic pressure changing unit 212, the hydraulic pressure of the hydraulic oil supplied to the lock-up clutch 32 is changed to a predetermined pressure for the predetermined time $t_{PC}$ calculated in the above step SA9, and the present routine is then finished. The above-indicated steps SA5 through SA9 correspond to the hydraulic pressure change time calculating unit 214. When the amount of change DTAP of the throttle opening TAP within the predetermined time is smaller than the predetermined value $DTAP_{ts}$, the hydraulic pressure change time $t_{PC}$ becomes equal to zero, and no change of the hydraulic pressure is made. Thus, the above-indicated step SA5 corresponds to the accelerator position change amount determining unit 210.

As described above, the control apparatus according to the present embodiment includes the hydraulic oil temperature determining unit 200 (SA1) that determines whether the oil temperature THO of the hydraulic oil is lower than the predetermined temperature $THO_{ts}$, the input torque change calculating unit 206 (SA2, SA3) that calculates a change in the input torque of the lock-up clutch 32, and the accelerator position change amount determining unit 210 (SA5) as the input torque change determining unit that determines whether the change in the input torque calculated by the input torque change calculating unit 206 is larger than the predetermined value. The control apparatus further includes the hydraulic pressure changing unit 212 (SA10) that changes the hydraulic pressure of the hydraulic oil supplied to the lock-up clutch 32 as a direct-coupled clutch to the predetermined pressure for the predetermined time $t_{PC}$, when the hydraulic oil temperature determining unit 200 determines that the oil temperature THO of the hydraulic oil is lower than the predetermined temperature $THO_{ts}$, and the accelerator position change amount determining unit 210 determines that the amount of change DTAP of the throttle opening TAP within the predetermined time is larger than the predetermined value $DTAP_{ts}$. With this arrangement, if a relatively rapid change in the input torque occurs when the temperature of the hydraulic oil is low, the control apparatus temporarily controls the hydraulic pressure of the lock-up clutch 32 to the predetermined pressure, thus assuring an improved response. Namely, the control apparatus for the lock-up clutch of the vehicle is able to avoid or suppress occurrence of hunting when the temperature of the hydraulic oil is low.

The hydraulic pressure changing unit 212 changes the length of the predetermined time $t_{PC}$ according to the change in the input torque calculated by the input torque change calculating unit 206, i.e., the amount of change DTAP of the throttle opening TAP within the predetermined time which is calculated by the accelerator position change amount calculating unit 202, and the rate of change ΔTAP of the throttle opening TAP calculated by the accelerator position change rate calculating unit 204. Thus, the hydraulic pressure of the hydraulic oil can be advantageously controlled to the predetermined pressure for a sufficient length of time $t_{PC}$.

The hydraulic pressure changing unit 212 also changes the length of the predetermined time $t_{PC}$ according to the oil temperature THO of the hydraulic oil. Thus, the hydraulic pressure of the hydraulic oil can be advantageously controlled to the predetermined pressure for a sufficient length of time $t_{PC}$.

In the following, other embodiments of the invention will be described in detail with reference to FIG. 14 and FIG. 15. In these figures, the same reference numerals as used in the previous embodiment will be used for identifying the same or corresponding steps or elements.

Figure 14:
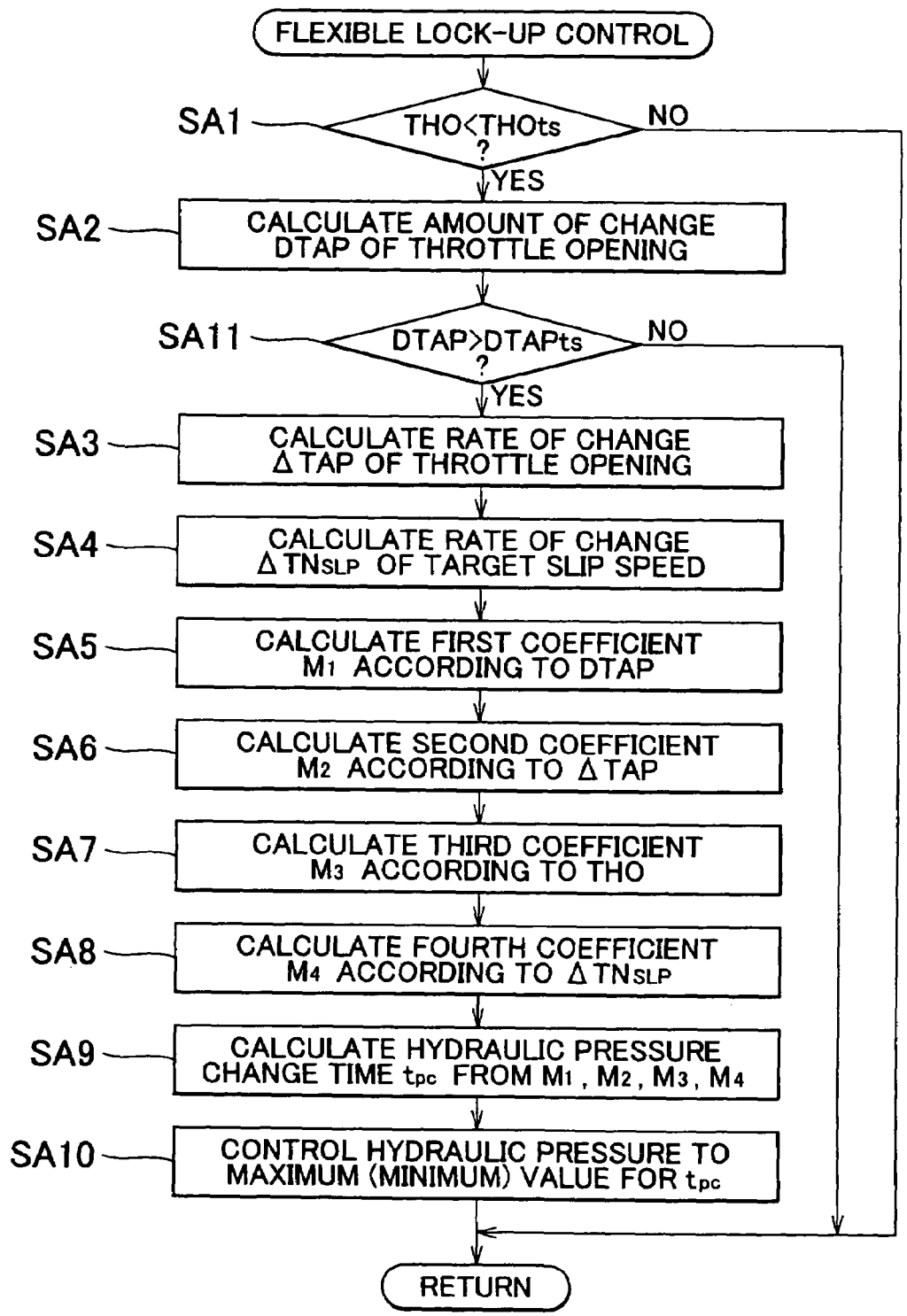
FIG. 14 is a flowchart explaining a principal part of another flexible lock-up control routine executed by the electronic control unit of FIG. 1.

FIG. 14 is a flowchart explaining a principal part of another flexible lock-up control routine executed by the electronic control unit 42. The routine of FIG. 14 is repeatedly executed at certain time intervals. In this routine, it is determined in step SA11 corresponding to the accelerator position change amount determining unit 210 whether the amount of change DTAP of the throttle opening TAP within the predetermined time which is calculated in step SA2 as described above is larger than the predetermined value $DTAP_{ts}$. If a negative determination is made in step SA11, the present routine is finished. If an affirmative determination is made in step SA11, step SA3 and subsequent steps as described above are executed. In this embodiment, it is advantageously determined, prior to steps SA5 through SA9 corresponding to the hydraulic pressure change time calculating unit 214, whether the amount of change DATP of the throttle opening TAP within the predetermined time is larger than the predetermined value $DTAP_{ts}$, namely, whether the change in the input torque of the lock-up clutch 32 is larger than the predetermined value.

FIG. 15 is a flowchart explaining a principal part of a further flexible lock-up control routine executed by the electronic control unit 42. The routine of FIG. 15 is repeatedly executed at certain time intervals. Steps SB1 through SB4 and SB10 shown in FIG. 15 are similar to the above-described steps SA1 through SA4 and SA10, and will not be explained herein. In the routine of FIG. 15, a first time $t_1$ is obtained in step SB5 based on the amount of change DTAP of the throttle opening TAP within the predetermined time which is calculated in step SB2, and a second time $t_2$ is obtained in step SB6 based on the rate of change ΔTAP of the throttle opening TAP calculated in step SB3. Then, a third time $t_3$ is obtained in step SB7 based on the oil temperature THO of the hydraulic oil, and a fourth time $t_4$ is obtained in step SB8 based on the rate of change $\Delta TN_{SLP}$ of the target slip speed $TN_{SLP}$ calculated in step SB4. Subsequently, the hydraulic pressure change time $t_{PC}$ is calculated in step SB9 according to the following expression (9), by summing time $t_1$ through $t_4$ obtained in the above steps SB5 through SB8. According to the present embodiment, the length of the predetermined time $t_{PC}$ is changed in accordance with the amount of change DTAP of the throttle opening TAP within the predetermined time, the rate of change ΔTAP of the throttle opening TAP, the rate of change $\Delta TN_{SLP}$ of the target slip speed $TN_{SLP}$ and the oil temperature THO of the hydraulic oil. Thus, the hydraulic pressure of the hydraulic oil can be advantageously controlled to the predetermined pressure for a sufficient length of time $t_{PC}$.

$$t_{PC} = t_1 + t_2 + t_3 + t_4 \quad (9)$$

While some exemplary embodiments of the invention have been described in detail with reference to the drawings, it is to be understood that the invention is not limited to the details of these embodiments, but may be otherwise embodied.

For example, the mathematical expression (7) used in the illustrated embodiment is merely one example of expressions according to which the drive current $I_{SLU}$ for temporarily controlling the hydraulic pressure of the hydraulic oil supplied to the lock-up clutch 32 to the predetermined pressure is calculated. Rather, the hydraulic pressure changing unit 212 may supply drive current $I_{SLU}$ calculated according to the following expression (10), (11) or (12) to the linear solenoid valve 54 so that the hydraulic pressure of the hydraulic oil supplied to the lock-up clutch 32 is temporarily controlled to the predetermined pressure. The drive current $I_{SLU}$ may also be calculated according to another mathematical expression. In the expression (12) below, $I_{THO}$ is a control value that depends upon the oil temperature THO of the hydraulic oil detected by the oil temperature sensor 199. Thus, the drive current $I_{SLU}$ calculated according to this expression (12) is a function of the oil temperature THO of the hydraulic oil.

$$I_{SLU} = G \cdot I_{F/F} + I_{F/B} + I_{LE} \quad (10)$$

$$I_{SLU} = G(I_{F/F} + I_{F/B}) + I_{LE} \quad (11)$$

$$I_{SLU} = G(I_{F/F} + I_{F/B} + I_{LE}) + I_{THO} \quad (12)$$

In the illustrated embodiment, the drive current $I_{SLU}^+$ calculated according to the expression (7) using gain $G^+$ causes the output port 112 of the linear solenoid valve 54 to temporarily output a signal pressure $P_{lin}$ that makes the pressure difference ΔP equal to the maximum value $\Delta P_{max}$. Also, the drive current $I_{SLU}^-$ calculated according to the expression (7) using gain $G^-$ causes the output port 112 of the linear solenoid valve 54 to temporarily output a signal pressure $P_{lin}$ that makes the pressure difference ΔP equal to the minimum value $\Delta P_{min}$. However, the signal pressure $P_{lim}$ temporarily generated from the output port 112 of the linear solenoid valve 54 by means of the hydraulic pressure changing unit 212 need not make the pressure difference ΔP equal to the maximum value $\Delta P_{max}$ or the minimum value $\Delta P_{min}$, but may be any value provided that occurrence of hunting can be suppressed or avoided.

While the input torque change calculating unit 206 calculates the amount of change DTAP and rate of change ΔTAP of the throttle opening TAP detected by the throttle sensor 188 in the illustrated embodiment, the calculating unit 206 may calculate the amount of change $DN_{in}$ and/or rate of change $\Delta N_{in}$ of the input shaft speed $N_{in}$ detected by the input shaft speed sensor 192. In this case, the input torque change determining unit 210 determines whether the amount of change $DN_{in}$ of the input shaft speed $N_{in}$ is larger than a predetermined value $DN_{ints}$.

In the illustrated embodiment, the input toque change determining unit 210 determines whether a change in the input torque is larger than a predetermined value by determining whether the amount of change DTAP of the throttle opening TAP is larger than the predetermined value $DTAP_{ts}$. However, the input torque change determining unit 210 may determine whether a change in the input torque is larger than a predetermined value by, for example, determining whether the rate of change ΔTAP of the throttle opening TAP is larger than a predetermined value $\Delta TAP_{ts}$.

While some embodiments of the invention have been illustrated above, it is to be understood that the invention is not limited to the details of the illustrated embodiments, but may be embodied with various changes, modifications or improvements, which may occur to those skilled in the art without departing from the spirit and scope of the invention.

What is claimed is:

1. A control apparatus for a lock-up clutch of a vehicle having a hydraulic torque transfer device equipped with the lock-up clutch between a power source and an automatic transmission, for controlling a hydraulic pressure of a hydraulic oil supplied to the lock-up clutch when the lock-up clutch is in a slip region, comprising:
   a hydraulic oil temperature determining unit that determines whether an oil temperature of the hydraulic oil is lower than a predetermined temperature;
   an input torque change calculating unit that calculates a change in input torque of the lock-up clutch;
   an input torque change determining unit that determines whether the change in the input torque calculated by the input torque change calculating unit is larger than a predetermined value; and
   a hydraulic pressure changing unit that changes the hydraulic pressure of the hydraulic oil supplied to the lock-up clutch to a predetermined pressure for a predetermined length of time, when the hydraulic oil temperature determining unit determines that the oil temperature of the hydraulic oil is lower than the predetermined temperature and the input torque change determining unit determines that the change in the input torque is larger than the predetermined value.

2. The control apparatus according to claim 1, wherein the hydraulic pressure changing unit changes the predetermined length of time according to the change in the input torque calculated by the input torque change calculating unit.

3. The control apparatus according to claim 2, wherein the hydraulic pressure changing unit changes the predetermined length of time according to the oil temperature of the hydraulic oil.

4. The control apparatus according to claim 3, further comprising a target slip speed change rate calculating unit that calculates a rate of change of a target slip speed of the lock-up clutch,
   wherein the hydraulic pressure changing unit changes the predetermined length of time according to the rate of change of the target slip speed.

5. The control apparatus according to claim 1, wherein the hydraulic pressure changing unit changes the predetermined length of time according to the oil temperature of the hydraulic oil.

6. The control apparatus according to claim 1, further comprising a target slip speed change rate calculating unit that calculates a rate of change of a target slip speed of the lock-up clutch,
   wherein the hydraulic pressure changing unit changes the predetermined length of time according to the rate of change of the target slip speed.

7. The control apparatus according to claim 1, wherein the input torque change calculating unit comprises at least one of an input torque change amount calculating unit that calculates an amount of change of the input torque within a predetermined time, and an input torque change rate calculating unit that calculates a rate of change of the input torque.

8. The control apparatus according to claim 7, wherein the input torque change amount calculating unit calculates an amount of change of a throttle opening within the predetermined time, and the input torque change rate calculating unit calculates a rate of change of the throttle opening.

9. The control apparatus according to claim 8, wherein the input torque change determining unit determines whether the amount of change of the throttle opening within the predetermined time is larger than a predetermined value.

10. A control method for a lock-up clutch of a vehicle having a hydraulic torque transfer device equipped with the lock-up clutch between a power source and an automatic transmission, for controlling a hydraulic pressure of a hydraulic oil supplied to the lock-up clutch when the lock-up clutch is in a slip region, comprising the steps of:
  determining whether an oil temperature of the hydraulic oil is lower than a predetermined temperature;
  calculating a change in input torque of the lock-up clutch;
  determining whether the change in the input torque is larger than a predetermined value; and
  changing the hydraulic pressure of the hydraulic oil supplied to the lock-up clutch to a predetermined pressure for a predetermined length of time, when it is determined that the oil temperature of the hydraulic oil is lower than the predetermined temperature and that the change in the input torque is larger than the predetermined value.

11. The control method according to claim 10, wherein the predetermined length of time is changed according to the change in the input torque.

12. The control method according to claim 11, wherein the predetermined length of time is changed according to the oil temperature of the hydraulic oil.

13. The control method according to claim 12, further comprising the step of calculating a rate of change of a target slip speed of the lock-up clutch,
  wherein the predetermined length of time is changed according to the rate of change of the target slip speed.

14. The control method according to claim 10, wherein the predetermined length of time is changed according to the oil temperature of the hydraulic oil.

15. The control method according to claim 10, further comprising the step of calculating a rate of change of a target slip speed of the lock-up clutch,
  wherein the predetermined length of time is changed according to the rate of change of the target slip speed.

16. The control method according to claim 10, wherein the change in the input torque is calculated by calculating at least one of an amount of change of the input torque within a predetermined time and a rate of change of the input torque.

17. The control method according to claim 16, wherein the amount of change of the input torque is calculated by calculating an amount of change of a throttle opening within the predetermined time, and the rate of change of the input torque is calculated by calculating a rate of change of the throttle opening.

18. The control method according to claim 17, wherein the step of determining whether the change in the input torque is larger than the predetermined value comprises determining whether the amount of change of the throttle opening within the predetermined time is larger than a predetermined value.

\* \* \* \* \*